United States Patent [19]

Higginbotham et al.

[11] Patent Number: 4,835,018
[45] Date of Patent: May 30, 1989

[54] ABRASION AND CORROSION RESISTANT PRIMER COATINGS

[75] Inventors: Clark A. Higginbotham, Crystal Lake; Kenneth E. Jasenof, Skokie; John Smyrniotis, Chicago, all of Ill.

[73] Assignee: DeSoto, Inc., Des Plaines, Ill.

[21] Appl. No.: 193,687

[22] Filed: May 13, 1988

[51] Int. Cl.⁴ .................... B05D 3/02; C08K 3/10
[52] U.S. Cl. ..................... 427/380; 427/386; 427/388.2; 427/388.5; 427/410; 523/458; 523/466
[58] Field of Search ............ 427/386, 388.2, 388.5, 427/380, 410; 523/458, 466

[56] References Cited

U.S. PATENT DOCUMENTS

| | | | |
|---|---|---|---|
| 3,896,187 | 7/1975 | Weil | 106/18.18 X |
| 4,433,014 | 2/1984 | Gaske et al. | 427/410 X |
| 4,605,570 | 8/1986 | Felter et al. | 427/386 |
| 4,720,403 | 1/1988 | Jasenof et al. | 427/140 X |

*Primary Examiner*—Michael Lusignan
*Attorney, Agent, or Firm*—Dressler, Goldsmith, Shore, Sutker & Milnanow, Ltd.

[57] ABSTRACT

Pigmented, abrasion and corrosion resistant, thermosetting organic solvent solution coating composition comprise: (A) from about 50 percent to about 85 percent of total resin solids of a triol-based blocked polyurethane polyisocyanate having a number average molecular weight in the range of 600 to 4000; (B) from about 15 percent to about 50 percent of total resin solids of an epoxy-phosphate provided by reacting a resinous polyepoxide with at least 0.05 mole of orthophosphoric acid per equivalent of oxirane in the polyepoxide; and (C) a corrosion-inhibiting pigment, preferably a chromium-containing pigment, providing resistance to corrosion. These coatings may be applied to the metal surface to be protected, or the metal surface may be protected with another primer which is overcoated with the subject coatings. The subject coatings are then topcoated, especially with pigmented fluorocarbon coatings.

19 Claims, No Drawings

ABRASION AND CORROSION RESISTANT PRIMER COATINGS

DESCRIPTION

Technical Field

The present invention relates to coating compositions for use as primer coatings on metal surfaces to provide coated surfaces that exhibit improved resistance to abrasion and corrosion. The invention includes coating systems which employ such primer coatings, and is an improvement over the primer coatings disclosed in U.S. Pat. No. 4,720,403 which issued on Jan. 19, 1988 to two of us and Ronald J. Lewarchik.

Background of the Invention

The events leading up to the contribution disclosed in the above-noted patent are set forth in that patent, but it is here noted that there are two areas in which the prior contribution required improvement. First, in the normal practice of the prior contribution, a polyepoxide-containing thermosetting coating, as described in claim 1 of the patent, is applied as a basecoat, and then an overcoat primer composition containing a resinous polyhydric alcohol and a polyisocyanate is applied. With these two primer coatings baked on the substrate, a topcoat is applied, this topcoat being a pigmented Fluropon topcoat which is described at the bottom of column 9 of the patent. It is found that reasonably acceptable properties require the use of both primer coatings, and this involves a total primer thickness of about 1.3 to about 1.4 mils. It is desired to reduce this thickness to the range of 1.0-1.3 mils if it can be done without impairing the desired abrasion and corrosion resistance. The application of two primer coatings requires two applications and two brakes, and it is desirable to be able to employ only a single application and a single bake to prepare the substrate for Fluropon topcoating. Single application significantly reduces the physical burden and cost of providing coated products, and is highly regarded by the coil applicators who produce the coated products under consideration.

Lastly, and in some instances in order to maximize abrasion resistance, it is desired to apply thicker primer coatings involving several layers of primer. In this invention it is desired to achieve maximum abrasion resistance in this manner without sacrificing the capacity of the coatings to withstand fabrication stresses.

DISCLOSURE OF INVENTION

In accordance with this invention pigmented, corrosion and abrasion resistant, thermosetting organic solvent solution coating compositions are provided which are suitable for use as protective primer coatings on metal surface, especially on galvanized steel and aluminum. One advantage of these coatings is that it can be applied directly to the metal surface without the preliminary polyepoxide coating described in said U.S. Pat. No. 4,720,403. Another advantage of these coatings is that they can be applied over the primary polyepoxide-containing primers described in said U.S. Pat. No. 4,720,403 to provide thicker fabrication-resistant coatings which provide still better resistance to abrasion.

In this invention, a pigmented, abrasion and corrosion resistant, thermosetting organic solvent solution coating composition comprises: (A) from about 50 percent to about 85 percent of total resin solids of an triol-based blocked polyurethane polyisocyanate having a number average molecular weight in the range of 600 to 4000; (B) from about 15 percent to about 50 percent of total resin solids of an epoxy-phosphate, this epoxy-phosphate being provided by reacting a resinous polyepoxide with at least 0.05 mole of orthophosphoric acid per equivalent of oxirane in the polyepoxide; and (C) a corrosion-inhibiting pigment, preferably a chromium-containing pigment, providing resistance to corrosion.

The resinous polyepoxide which is phosphated for use in this invention is preferably a diglycidyl ether of a bisphenol having a number average molecular weight in the range of from about 500 to about 6,000 and a 1,2-epoxy equivalency of at least about 1.3, more preferably a diglycidyl ether of a bisphenol having a number average molecular weight in the range of from 800 to 3,000 and a 1,2-epoxy equivalency of at least about 1.4, most preferably from 1.7 to 2.0.

The term "bisphenol" denotes a pair of phenolic groups linked together through an intervening divalent structure which is usually an alkylene group. When the phenolic OH groups on each of the phenol portions of the bisphenol are in the para position, and using 2,2-propylene as the intervening divalent structure, the product is a commercially available material known as bisphenol A which is used in the examples herein.

The epoxy-phosphate preferably contains from 0.05 to 0.7 mole of phosphoric acid per equivalent of oxirane in said polyepoxide, more preferably from 0.1 to 0.5 mole of phosphoric acid per equivalent of oxirane. The balance of the oxirane functionality is preferably consumed by hydrolysis.

These epoxy-phosphates are themselves well known and are provided by reacting the resinous polyepoxide with phosphoric acid in organic solvent solution medium to cause reaction of one of the three P-OH groups with the oxirane group of the polyepoxide, a reaction which is easily carried out by simply heating the reactants together, preferably at a temperature of at least about 50° C., preferably from about 70° C. to about 110° C. Water is desirably present to hydrolyze those oxirane groups which are not consumed by the reaction with phosphoric acid. Of course, one can use phosphorus pentoxide and then water, and this is regarded to be equivalent to the use of phosphoric acid.

The epoxy phosphates can be used as such, or they can be neutralized by reaction with an amine, like triethyl amine or dimethyl ethanol amine which makes them dispersible in water. A small amount of water may be present in these products without deleterious effect. We produce epoxy phosphates for other purposes, and tend to use them in the form they are available since it does not seem to matter whether they are neutralized or not, or whether they bring in with them a small proportion of water.

The triol-based blocked polyurethane polyisocyanate having a number average molecular weight in the range of 600 to 4000 are preferably hydroxy-terminated polyesters which are terminated by reaction with diisocyanates which are blocked to prevent premature reaction. One triol which may be used is trimethylol propane, but an isocyanurate such as tris-hydroxyethyl isocyanurate, is also useful. The corresponding hydroxypropyl or hydroxybutyl isocyanurates are also useful. Diols, such as butane diol and hexane diol, may also be present to extend the branches from the triol base of the polyester, as will be illustrated hereinafter.

These trihydric alcohols are chain extended, preferably by polyester formation with diols and dicarboxylic acids, to provide the desired number average molecular weight, and the hydroxy-terminated resins so-provided are finally reacted with a half-blocked organic diisocyanate. This reaction involves the formation of urethane groups and can be carried out in several ways, as those familiar with the art will understand. The blocking agent is removed when the coatings of this invention are baked, and this releases the isocyanate groups for cure.

While dicarboxylic acids are usually used in the formation of the hydroxy-terminated polyester, as above-noted, one can also react the triol with an hydroxy carboxylic acid, preferably in the form of a lactone, such as epsilon caprolactone. This is used in a proportion to provide the desired chain length. On the other hand, one can use a glycol, such as ethylene glycol, propylene glycol or butylene glycol (or the corresponding oxides) to form a polyether of desired chain length. One can also proceed in stages to first react with diisocyanate and then with glycol until the desired molecular weight is provided and then, if the product is not already terminated with diisocyanate, additional diisocyanate is reacted in to provide isocyanate terminal groups for blocking.

The blocking agents and their use is conventional, even simple alcohols, such as ethyl hexanol, being fully useful. In addition to alcohols as the blocking agent, one can use oximes, lactams, phenols, triazoles and amides. Epsilon caprolactam is a preferred blocking agent and will be illustrated herein, but its selection is largely a matter of convenience. This is because the coatings of this invention are cured at about 450° F.–465° F., at which temperature almost any of the known blocking agent will unblock to enable satisfactory use thereof.

The organic diisocyanates can vary considerably, toluene diisocyanate and isophorone diisocyanate being commonly available and useful herein. We presently prefer to employ an aliphatic diisocyanate in which the two isocyanate groups are of about equal reactivity, as for example in the compound 1,6-hexane diisocyanate.

In preferred practice, an hydroxy-terminated polyester is formed and reacted with a half-blocked diisocyanate. Thus, the diisocyanate is separately reacted with one molar proportion of the blocking agent to consume one of its two isocyanate groups, and the half-blocked monoisocyanate so-formed is reacted with the hydroxy groups of the hydroxy-terminated polyester. If some diisocyanate is present in admixture with the half-blocked diisocyanate it merely serves to increase the molecular weight of the polyester, which is permissible. As is well known, this preferred procedure is subject to wide variation.

The corrosion-inhibiting pigments which may be used herein are usually chromium-containing pigments, and these are well known and are illustrated herein by strontium chromate, which is preferred. Zinc phosphate and barium metaborate illustrate corrosion-inhibiting pigments which are not based on chromium but which are useful, albeit the chromium-containing pigments are preferred, as indicated previously.

The coating compositions of this invention preferably contain the corrosion-inhibiting pigments in a weight ratio with respect to the total weight of resin solids of about 0.1:1 to 0.6:1, more preferably in a weight ratio with res0pect to the total weight of resin solids of about 0.2:1 to 0.5:1.

The coating compositions of this invention preferably further includes a clay having the capacity to fix phosphate, this clay desirably having an anion-exchange capacity of at least about 10 milliequivalents per 100 grams of clay. This clay is preferably present in a weight ratio with respect to the total weight of resin solids of about 0.1:1 to 1:1, more preferably in a weight ratio with respect to the total weight of resin solids of about 0.3:1 to 0.8:1. However, these clays can be omitted while retaining satisfactory properties, as illustrated hereinafter in Example 1.

The composition can further include an amount of a thickening agent sufficient, preferably less than about 2 percent by weight, to stably disperse the chromium-containing pigment and a polar solvent in an amount to allow the thickening agent to exhibit its thickening action.

The application of the coatings of this invention is preferably carried out by roll coating, but other coating techniques, such as immersion, spraying, brushing and the like may also be used.

While any attractive topcoat may be applied over the primers of this invention, it is preferred to employ fluorocarbon topcoats which contain a polymer of vinyl fluoride or vinylidene fluoride, preferably the latter. These fluorocarbon topcoats provide long term durability fitting the coated substrates of this invention for long term outdoor exposure resistance. These topcoats are commercially available under the trade name Fluropon from DeSoto, Inc. Des Plaines, IL.

The same topcoating previously applied over the previously used primer coatings develop greater abrasion resistance when deposited over the primer coatings of this invention, as illustrated hereinafter. This is an important advantage.

These topcoats are preferably pigmented with pigments capable of resisting a high temperature bake and applied over the primer coatings of this invention in an amount sufficient to form a layer having a thickness from about 0.7 to about 1.3 mils, more preferably from 0.8 to 1.0 mil.

EXAMPLE 1

Into a five liter reaction flask equipped with a stirrer, condenser, glycol column, Dean-Stark trap, nitrogen inlet tube, thermometer and heating mantle, there were added the following: 554.2 grams 1,6-hexane diol, 1013.2 grams di(2-hydroxymethyl) dimethyl hydantoin, 239.5 grams of trimethylol propane, 368.2 grams of terephthalic acid, 368.2 grams of isophthalic acid, 8.2 grams tetraoctyl titanate catalyst and 100 grams of xylene. While sparging with nitrogen the reaction mixture was heated to reflux for a ten hour period after which the temperature was 236° C. During this period 160 grams of water was collected and an acid value of less than one was obtained. The reaction mixture was cooled to 125° C. and 647.2 grams of adipic acid were added followed by an additional 100 grams of xylene. The reaction mixture was then reheated to reflux for six hours while collecting 158 grams of water. The temperature was then 216° C. and the acid value was less than five. The small amount of remaining xylene was then blown out by increasing the nitrogen sparge rate, and the temperature reduced to 145° C. 1,194 grams of the aromatic hydrocarbon solvent mixture Solvesso 150 was then added with stirring to provide a solution containing 70% solids and having a viscosity of 950 centipoises.

82 parts of the above polyester solution are combined with 18 parts of a half-blocked diisocyanate prepared by reacting 1,6-hexane diisocyanate (one may use the Mobay product Desmodur N-100) with epsilon caprolactam, as follows.

In a reactor equipped with heating and an inert gas sparge, add 47 parts of 1,6-hexane diisocyanate and 10 parts of a commercial mixture of glycol ethers (85% propylene glycol methyl ether acetate and 15% dipropylene glycol methyl ether acetate) (Dowanol BC-300 supplied by Dow Chemical Company). Heat to 70° C. while sparging with nitrogen and then add 10 parts of epsilon caprolactam and heat to 80° C. Hold for one hour and add another 10 parts of epsilon caprolactam. Hold for another hour at 80° C. and then add 12 parts of epsilon caprolactam and 10 parts of Dowanol BC-300. Reheat to 80° C. and hold until the NCO number is less than 0.1%.

EXAMPLE 2

Example 1 of U.S. Pat. No. 4,720,403 is repeated replacing the Shell product Epon 1007 used there with an equivalent proportion of Shell product Epon 1004 (a diglycidyl ether of bisphenol A having a number average molecular weight of about 1850). The neutralized product contains some water, but this is ignored. Indeed, neutralization is not considered necessary but is tolerated since this happens to be the form in which this product is most conveniently available to us. We can also use the alternative epoxy phosphate described at the bottom of column 8 of U.S. Pat. No. 4,720,403.

EXAMPLE 3

A coating composition was provided by simply mixing together the triol-based polyurethane blocked polyisocyanate product of Example 1, the epoxy phosphate product of Example 2 and auxiliary materials and then grinding the pigments into the solution to provide the composition listed below.

| Component | % by weight |
|---|---|
| 1- Blocked polyisocyanate of Example 1 | 5.93 |
| 2- Epoxy phosphate of Example 2 | 2.19 |
| 3- Dislon L-1980 (see note 1) | 0.39 |
| 4- Bentone SD-2 (see note 2) | 0.29 |
| 5- Naphthalene solvent (see note 3) | 1.96 |
| 6- Dibutyltin dilaurate (catalyst) | 0.39 |
| 7- Dimethylethanolamine (in item 2) | 0.61 |
| 8- Water (in item 2) | 0.61 |
| 9- Dimethyl formamide | 15.66 |
| 10- Glycol solvents (see note 4) | 1.56 |
| 11- Ester solvents (see note 5) | 22.75 |
| 12- Butanol | 0.51 |
| 13- Strontium Chromate | 7.34 |
| 13- Solvesso 150 (see note 6) | 16.81 |
| 14- Treated wollastonite (see note 7) | 12.23 |
| 15- Zinc oxide | 2.94 |
| 16- Titanium dioxide | 7.83 |

Note 1: A polyacrylate flow control agent.
Note 2: Quanternized Montmorilonite clay.
Note 3: A high boiling solvent mixture of naphthalene compounds supplied by Henkel (German Corporation) as Henkel 4HN.
Note 4: Dowanol BC-300 described previously.
Note 5: A commercial mixture of dimethyl adipate, dimethyl glutarate and dimethyl succinate supplied by duPont under the designation dibasic ester.
Note 6: A commercial mixture of aromatic hydrocarbon solvents having a boiling range of from 362–410° F.
Note 7: An epoxy-treated calcium metasilicate supplied by Nyco Chemical Co.

The above composition is applied as a primer in a thickness of 1.2–1.3 mils and cured by baking at 450°–465° F. for 25–30 seconds. The baked primer is then topcoated with Fluropon in a thickness of 0.9 mils and baked again in the same manner to provide a final composition for test.

The standard product produced using the two primer coatings totalling about 1.4 mils in said U.S. Pat. No. 4,720,403 and topcoated as above described was reasonably satisfactory, but it fell down in three ways. First, the finished composite coating was less bendable than desired passing a 2T bend test, but failing a 1T bend. The composition of this example passed the 1T bend test, and thus better resists bending. Second, the "Falling Sand" Abrasion Test was less satisfactory, the standard product passing only 60 liters of sand. The thinner composition of this example is more abrasion resistant passing 132 liters of sand. It is especially surprising to find this greater abrasion resistance in a thinner coating when abrasion resistance normally increases with increasing thickness. Third, the corrosion was improved. This was determined in two different ways. In one test, and following 2000 hours of 5% salt spray, it was found that the standard product exhibited dense blisters of various size. The coating of this invention showed no blisters. A scribe test on the salt-sprayed product produced ¼ inch creep away from the scribed line when a strongly adherent pressure-sensitive tape was applied and peeled away, while the coating of this invention showed only ⅛ inch creep in the same test.

In a variation, the epoxy resin prime coat described in the Examples of U.S. Pat. No. 4,720,403 was used and overcoated with two coatings of the product of this Example and then topcoated with 0.9 mils of Fluropon coating, each coating being baked as noted previously. The resulting composite coating was 3.0 mils in total thickness and was just as good as the coating of this invention described in the previous paragraph. The exception was that the "Falling Sand" abrasion test for this thicker composite coating was now improved to allow the coating to resist 230 liters of sand. In some instances this improved abrasion resistance can be important.

EXAMPLE 4

| | Percent by Weight |
|---|---|
| 1- Blocked polyisocyanate of Example 1 | 27.4 |
| 2- Epoxy Phosphate of Example 2 | 3.0 |
| 3- Dislon L-1980 (see note 1) | 0.4 |
| 4- Bentone SD-2 (see note 2) | 0.3 |
| 5- Naphthalene solvent (see note 3) | 2.0 |
| 6- Dibutyltin dilaurate (catalyst) | 0.4 |
| 7- Water (in item 2) | 0.6 |
| 8- Dimethylethanolamine (in item 2) | 0.6 |
| 9- Dimethyl formamide | 16.2 |
| 10- Glycol solvents (see note 4) | 2.2 |
| 11- Solvesso 150 (see note 6) | 10.4 |
| 12- China Clay | 14.3 |
| 13- Strontium Chromate | 7.9 |
| 14- Titanium dioxide | 14.3 |
| | 100.0 |

The above notes are the same as in Example 1. The composition of this example can be used in place of the composition of Example 3 with corresponding results.

What is claimed is:

1. A pigmented, abrasion and corrosion resistant, thermosetting organic solvent solution coating composition comprising: (A) from about 50 percent to about 85 percent of total resin solids of a triol-based blocked polyurethane polyisocyanate having a number average molecular weight in the range of 600 to 4000; (B) from about 15 percent to about 50 percent of total resin solids of an epoxy-phosphate, said epoxy-phosphate being provided by reacting a resinous polyepoxide with at least 0.05 mole of orthophosphoric acid per equivalent of oxirane in said polyepoxide; and (C) a corrosion-inhibiting pigment providing resistance to corrosion.

2. The coating composition of claim 1 further including a clay having the capacity to fix phosphate.

3. The coating composition of claim 1 in which said resinous polyepoxide is a diglycidyl ether of a bisphenol having a number average molecular weight in the range of from about 500 to about 6,000 and a 1,2-epoxy equivalency of at least about 1.3.

4. The coating composition of claim 1 in which said resinous polyepoxide is a diglycidyl ether of a bisphenol having a number average molecular weight in the range of from 800 to 3,000 and a 1,2-epoxy equivalency of at least about 1.4.

5. The coating composition of claim 4 in which said epoxy-phosphate contains from 0.05 to 0.7 mole of phosphoric acid per equivalent of oxirane in said polyepoxide, the balance of the oxirane functionality being consumed by hydrolysis.

6. The coating composition of claim 1 in which said corrosion-inhibiting pigment is a chromium-containing pigment present in a weight ratio with respect to the total weight of resin solids of about 0.1:1 to 0.6:1.

7. The coating composition of claim 5 in which said chromium-containing pigment is present in a weight ratio with respect to the total weight of resin solids of about 0.2:1 to 0.5:1.

8. The coating composition of claim 6 further including a clay having an anion-exchange capacity of at least about 10 milliequivalents per 100 grams of clay.

9. The coating composition of claim 8 in which said clay is present in a weight ratio with respect to the total weight of resin solids of about 0.1:1 to 1:1.

10. The coating compositions of claim 7 in which said clay is present in a weight ratio with respect to the total weight of resin solids of about 0.3:1 to 0.8:1.

11. The coating composition of claim 10 in which said chromium-containing pigment is strontium chromate.

12. The coating composition of claim 1 in which said triol-based blocked polyurethane polyisocyanate is a polyester.

13. The coating composition of claim 12 in which said triol-based blocked polyurethane polyisocyanate is based on trimethylol propane.

14. The coating composition of claim 12 in which said isocyanurate-based blocked polyurethane polyisocyanate is formed by reaction with an aliphatic diisocyanate.

15. The coating composition of claim 12 in which said aliphatic diisocyanate is 1,6-hexane diisocyanate.

16. A method of protecting a metal substrate comprising applying thereto the coating composition of claim 1 to form a first layer on said substrate, baking said first layer to cure the same on said substrate, and then overcoating with a pigmented topcoat.

17. A method as recited in claim 16 in which said topcoat is a fluorocarbon coating.

18. A method as recited in claim 16 in which said first layer has a thickness of from 1.0–1.3 mils.

19. A method of protecting a metal substrate comprising applying thereto a polyepoxide-containing thermosetting primer composition containing an epoxy phosphate and a chromium-containing pigment providing resistance to corrosion, baking said primer composition, then applying atop said baked primer composition the coating composition of claim 1 to form at least one further layer of coating, baking said further layer to cure the same on said substrate, and then overcoating with a pigmented fluorocarbon coating.

* * * * *

UNITED STATES PATENT AND TRADEMARK OFFICE
CERTIFICATE OF CORRECTION

PATENT NO. : 4,835,018

DATED : May 30, 1989

INVENTOR(S) : Clark A. Higginbotham, Kenneth E. Jasenof, John Smyrniotis

It is certified that error appears in the above-identified patent and that said Letters Patent is hereby corrected as shown below:

Col. 1, line 35, "brakes" should be --bakes--.
Col. 3, line 65, "resOpest" should be --respect--.
Col. 8, line 1, "compositions" should be --composition--.

Signed and Sealed this

Seventeenth Day of July, 1990

*Attest:*

HARRY F. MANBECK, JR.

*Attesting Officer*     *Commissioner of Patents and Trademarks*